US012625831B2

(12) United States Patent
Konduru et al.

(10) Patent No.: US 12,625,831 B2
(45) Date of Patent: May 12, 2026

(54) DYNAMIC LOAD CURRENT ADJUSTMENT TO AVOID PFM FREQUENCY IN AUDIO RANGE

(71) Applicant: Cypress Semiconductor Corporation, San Jose, CA (US)

(72) Inventors: Ravi Theja Konduru, Nellore (IN); Hemant Vispute, Bangalore (IN); Yeshwanth Kaligonahalli Thippeswamy, Bangalore (IN)

(73) Assignee: Infineon Technologies Americas Corp., El Segundo, CA (US)

( * ) Notice: Subject to any disclaimer, the term of this patent is extended or adjusted under 35 U.S.C. 154(b) by 32 days.

(21) Appl. No.: 18/394,953

(22) Filed: Dec. 22, 2023

(65) Prior Publication Data

US 2025/0209023 A1 Jun. 26, 2025

(51) Int. Cl.
*G06F 13/38* (2006.01)
*G06F 13/42* (2006.01)

(52) U.S. Cl.
CPC ........ *G06F 13/382* (2013.01); *G06F 13/4282* (2013.01); *G06F 2213/0042* (2013.01)

(58) Field of Classification Search
CPC ...................................................... G06N 7/01
See application file for complete search history.

(56) References Cited

U.S. PATENT DOCUMENTS

| | | | | |
|---|---|---|---|---|
| 10,483,849 | B1 * | 11/2019 | Saleem | H02M 3/1584 |
| 2016/0291663 | A1 * | 10/2016 | Sun | G06F 13/4022 |
| 2021/0097017 | A1 * | 4/2021 | Santini | G06F 1/266 |

OTHER PUBLICATIONS

"UCC28880, UCC28881 Audible Noise Reduction Techniques", Texas Instruments Incorporated, Mar. 2017, 7 pages.
"High Efficiency High Voltage 500mA Synchronous Step-Down Converter", LTC3630AEMSE/LTC3630EMSE, Demo Manual DC2105A, Linear Technology Corporation, 2013, 8 pages.
Charlie Zhao, "65V, 500mA Step-Down Converter Fits Easily into Automotive and Industrial Applications", Design Note 512, Linear Technology Corporation, 2013, 2 pages.
George E Matthew, et al., "Low power all digital acoustic noise suppression technique for switching voltage regulators", Intel Corporation, 2015, 6 pages.
"High Efficiency, 65V 500mA Synchronous Step-Down Converter", Linear Technology Corporation, 2012, 26 pages.

* cited by examiner

*Primary Examiner* — Henry Tsai
*Assistant Examiner* — Juanito C Borromeo

(57) ABSTRACT

In an embodiment of the techniques presented herein, a universal serial bus power delivery (USB-PD) power adaptor includes a USB port, and a USB controller configured to deliver power to the USB port, wherein the USB controller includes a voltage regulator configured to generate a power supply voltage based on a pulse frequency modulation (PFM) signal, and a variable current bleed unit configured to generate a variable current bleed load on the voltage regulator based on a frequency of the PFM signal to maintain the frequency of the PFM signal above an audible frequency range.

20 Claims, 6 Drawing Sheets

702 — DELIVER POWER TO USB PORT USING USB CONTROLLER

704 — GENERATE POWER SUPPLY VOLTAGE FOR USB CONTROLLER IN VOLTAGE REGULATOR BASED ON PULSE FREQUENCY MODULATION (PFM) SIGNAL

706 — GENERATE VARIABLE CURRENT BLEED LOAD ON VOLTAGE REGULATOR BASED ON FREQUENCY OF PFM SIGNAL TO MAINTAIN FREQUENCY OF PFM SIGNAL ABOVE AUDIBLE FREQUENCY RANGE

700

DYNAMIC LOAD CURRENT ADJUSTMENT TO AVOID PFM FREQUENCY IN AUDIO RANGE

BACKGROUND

Various electronic devices (e.g., such as smartphones, tablets, notebook computers, laptop computers, hubs, chargers, adapters, etc.) are configured to transfer power through Universal Serial Bus (USB) connectors according to USB power delivery protocols defined in various revisions of the USB Power Delivery (USB-PD) specification. Alternating current to direct current (AC-DC) converters convert power from an alternating current (AC) source to a direct current (DC) source at a specified voltage level. A buck converter is a DC-DC switching converter that steps down an input voltage while increasing load current. One technique for controlling a buck converter is a pulse frequency modulation (PFM) techniques that controls the switching using a signal that changes the pulse frequency as a function of load current to maintain the output voltage. As the load current increases, the PFM frequency increases, and as the load current decreases the PFM frequency decreases.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In an embodiment of the techniques presented herein, a universal serial bus power delivery (USB-PD) power adaptor comprises a USB port, and a USB controller configured to deliver power to the USB port, wherein the USB controller comprises a voltage regulator configured to generate a power supply voltage based on a pulse frequency modulation (PFM) signal, and a variable current bleed unit configured to generate a variable current bleed load on the voltage regulator based on a frequency of the PFM signal to maintain the frequency of the PFM signal above an audible frequency range.

In an embodiment of the techniques presented herein, a method for operating a universal serial bus power delivery (USB-PD) power adaptor comprises delivering power to a USB port using a USB controller, generating a power supply voltage for the USB controller in a voltage regulator based on a pulse frequency modulation (PFM) signal, and generating a variable current bleed load on the voltage regulator based on a frequency of the PFM signal to maintain the frequency of the PFM signal above an audible frequency range.

In an embodiment of the techniques presented herein, a system for operating a universal serial bus power delivery (USB-PD) power adaptor comprises means for delivering power to a USB port using a USB controller, means for generating a power supply voltage for the USB controller in a voltage regulator based on a pulse frequency modulation (PFM) signal, and means for generating a variable current bleed load on the voltage regulator based on a frequency of the PFM signal to maintain the frequency of the PFM signal above an audible frequency range.

In an embodiment of the techniques presented herein, a universal serial bus power delivery (USB-PD) power adaptor comprises a USB port, a power switch connected between a voltage input terminal and the USB port, and a USB controller configured to control the power switch to deliver power to the USB port from the voltage input terminal, wherein the USB controller comprises a voltage regulator configured to generate a power supply voltage based on a pulse frequency modulation (PFM) signal, and a variable current bleed unit configured to generate a variable current bleed load on the voltage regulator based on a frequency of the PFM signal to maintain the frequency of the PFM signal above an audible frequency range.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
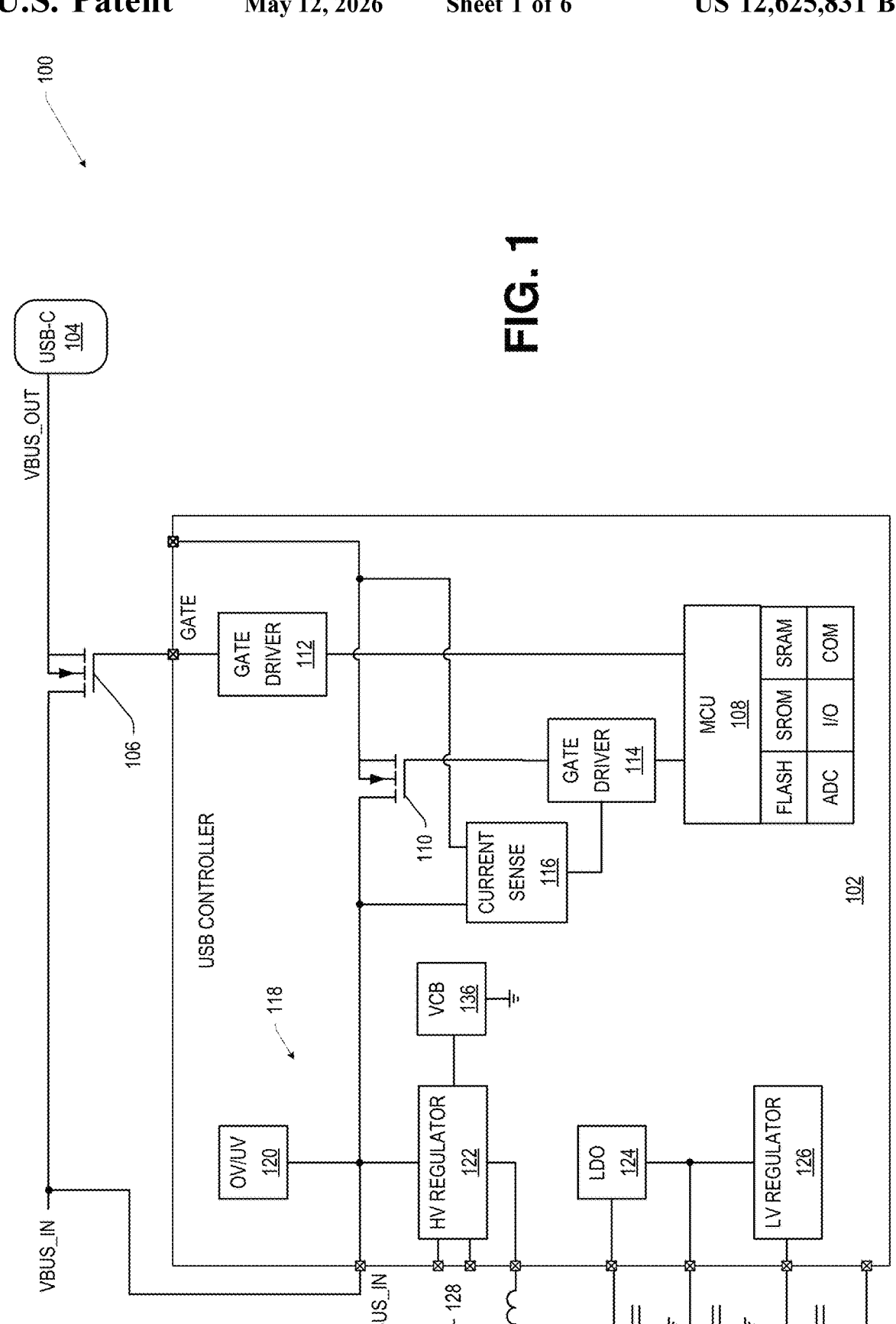
FIG. 1 is a block diagram illustrating a universal serial bus (USB) power delivery (USB-PD) adaptor, in accordance with some embodiments.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

It is to be understood that the following description of embodiments is not to be taken in a limiting sense. The scope of the present disclosure is not intended to be limited by the embodiments described hereinafter or by the drawings, which are taken to be illustrative only. The drawings are to be regarded as being schematic representations and elements illustrated in the drawings are not necessarily shown to scale. Rather, the various elements are represented such that their function and general purpose become apparent to a person skilled in the art.

All numerical values within the detailed description and the claims herein are modified by "about" or "approximately" the indicated value, and take into account experimental error and variations that would be expected by a person having ordinary skill in the art.

FIG. 1 is a block diagram illustrating a universal serial bus (USB) power delivery (USB-PD) adaptor 100, in accordance with some embodiments. In some embodiments, the USB-PD adaptor 100 comprises a USB controller 102 (also referred to as USB-PD controller), as shown, as part of a DC/DC-controller or subsystem. The USB-PD adaptor 100 comprises at least one USB port 104, however, any number of USB ports may be provided. The USB port 104 is connected to provide an output voltage, VBUS_OUT, to a connected load. The USB controller 102 controls a power switch 106 to deliver power to the USB port 104 from an input terminal, VBUS_IN, to the USB port 104.

In some embodiments, the USB controller 102 comprises a microcontroller unit (MCU) subsystem 108 including logic, memory (e.g., flash, static read only memory (SROM), static random access memory (SRAM), or other memory), and a microprocessor or controller for executing programs stored memory in the MCU subsystem, analog-to-digital converters (ADCs), a number of general purpose input/outputs (GPIOs), and a serial communication bus (SCB). The USB controller 102 comprises a power switch 110 connected in parallel with the power switch 106 between VBUS_IN and VBUS_OUT, a gate driver 112 for controlling the power switch 106, a gate driver 114 for controlling the power switch 110, a current sense unit 116 configured to measure current through the power switch 110 and control the gate driver 114 to limit the current provided through the power switch 110. In some embodiments, the current sense unit 116 comprises logic for controlling the gate driver 114. In some embodiments, the logic in the current sense unit 116 may be provided by the MCU subsystem 108. The use of the path through the power switch 106 versus the current limited path through the power switch 110 is dependent on the contract established by the USB controller 102 with a device connected to the USB port 104.

The USB controller 102 further comprises a voltage regulation subsystem 118 for providing protection and generating internal voltage supplies for the USB controller 102. In some embodiments, the voltage regulation subsystem 118 comprises a overvoltage/undervoltage (OV/UV) unit 120 configured to provide protection on the VBUS_IN line, a high voltage (HV) regulator 122, a low dropout regulator (LDO) 124, and a low voltage (LV) regulator 126. In some embodiments, external circuit elements, such as an inductor 128 or capacitors 130, 132, 134 are provided as storage and filtering elements for the HV regulator 122, the LDO 124, and the LV regulator 126.

In some embodiments, the HV regulator 122 is a pulse frequency modulated (PFM) buck converter that provides PFM signals to a switch to store energy in the inductor 128 to generate an output voltage (e.g., 3.6V) at the capacitor 130 by stepping down the input voltage, VBUS_IN. The frequency of the PFM signal (e.g., the time interval between pulses) depends on the load on the HV regulator 122. As the load current drops and the frequency decreases, the PFM frequency may fall into the audible range (e.g., 20 Hz to 20 KHz), where vibrations in the inductor 128 and the capacitor 130 may be heard by a user. To avoid generating audible noise in the HV regulator 122 a variable current bleed unit (VCB) 136 is provided to generate additional current load on the HV regulator 122 to keep the PFM signal out of the audible range. The VCB 136 increases the bleed current as the load on the HV regulator 122 drops to avoid generating audible noise. The variable bleed current approach only draws the minimum current required to keep the system out of an audible frequency range, thereby conserving power compared to a fixed bleed current approach. The VCB 136 may be implemented using a digital circuit or an analog circuit.

Figures 2, 3:
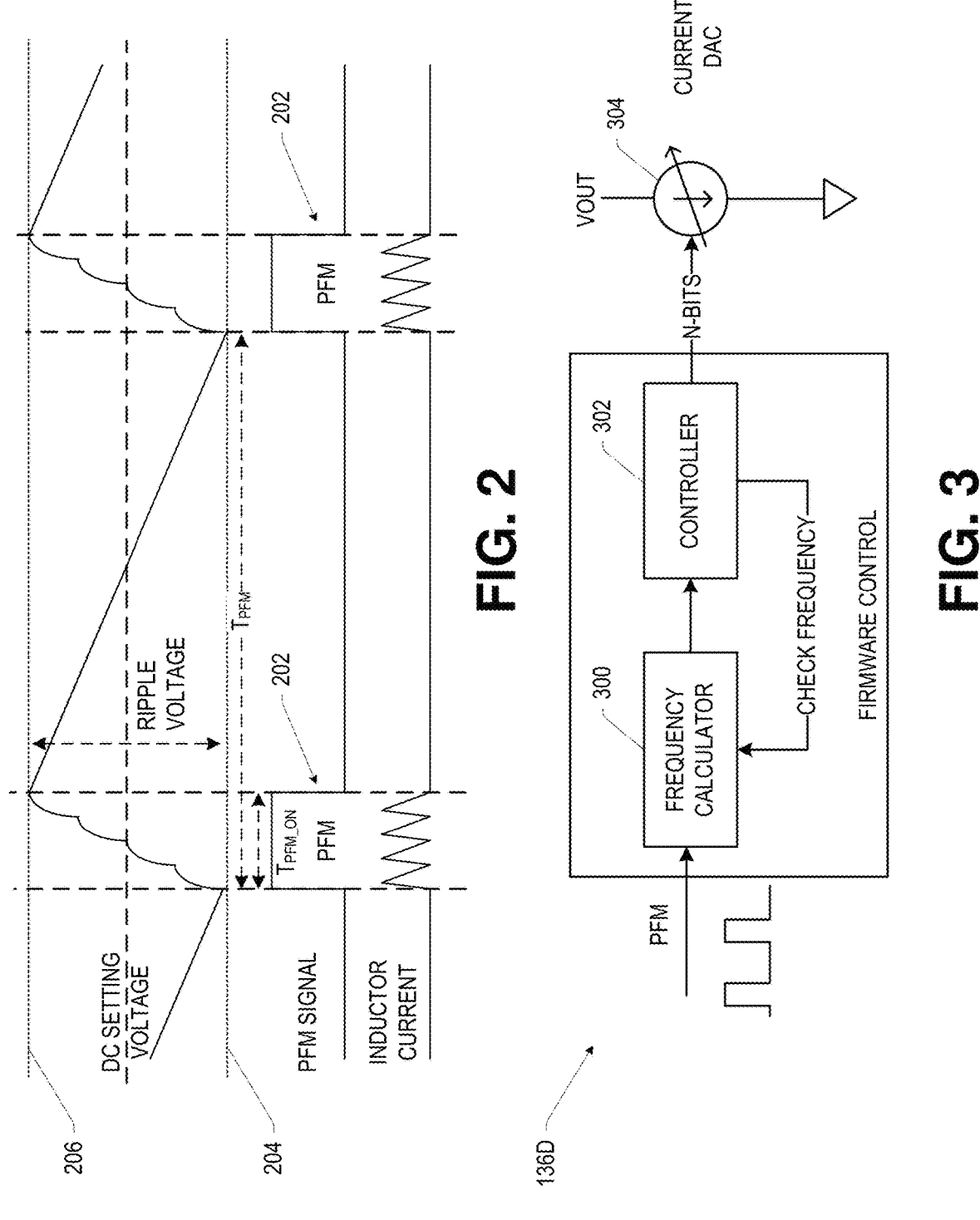
FIG. 2 is a diagram illustrating the operation of a high voltage regulator, in accordance with some embodiments.
FIG. 3 is a block diagram of a digital variable current bleed unit, in accordance with some embodiments.

FIG. 2 is a diagram 200 illustrating the operation of the HV regulator 122, in accordance with some embodiments. The HV regulator 122 operates in a hysteresis or ripple mode, where a DC setting voltage is selected for the internal supply voltage of the USB controller 102, such as 3.6V. The HV regulator 122 employs a series of switching cycles in a PFM pulse 202 during a charge interval, $T_{PFM\_ON}$, to induce current in the inductor 128 and generate the internal supply voltage on the capacitor 130. The PFM pulse 202 is initiated responsive to the voltage on the capacitor 130 reaching a negative hysteresis limit 204, and the PFM pulse 202 is maintained until the DC voltage on the capacitor 130 reaches a positive hysteresis limit 206. The time interval, $T_{PFM}$, between PFM pulses 205 is determined based on the load current, i_L, of the devices in the USB controller 102 using the internal supply voltage and the bleed current, i_BL, generated by the VCB 136. The length of the PFM cycle 202 depends on the total current, the hysteresis voltage, $V_{HYS}$, and the capacitance, $C_{CNVT}$, of the HV regulator 122 according to:

$$T_{PFM} = \frac{C_{CNVT} * V_{HYS}}{i\_BL + i\_L}.$$

The ripple or hysteresis voltage, $V_{HYS}$, of the HV regulator 122 is the difference between the hysteresis limits, 204, 206. As the load decreases, $T_{PFM}$ increases. Without intervention from the VCB 136, $T_{PFM}$ could correspond to a frequency in the audible range, thereby generating audible noise in the inductor 128, the capacitor 130, or other components of the USB controller 102.

FIG. 3 is a block diagram of a digital VCB 136D, in accordance with some embodiments. In some embodiments, the digital VCB 136D is implemented in the firmware of the USB controller 102. The PFM signal is received by a frequency calculator 300 that determines the frequency of the PFM signal based on the time interval, $T_{PFM}$, between PFM pulses 205. A controller 302 compares the PWM frequency to a first threshold, such as a value greater than 20 KHz. If the PFM frequency is less than the first threshold, the controller 302 increments a current code provided to a current digital-to-analog converter (DAC) 304. The current DAC 304 is a circuit, such as a binary weighted current ladder, that generates a current based on the digital value of the current code. If the PFM frequency is greater than a second threshold, the controller 302 decrements the current code. Thus, as the load on the HV regulator 122 decreases and the PFM frequency decreases, the controller 302 increments the current code to increase the current load generated by the digital VCB 136D to keep the PFM frequency out of the audible range. At a later time, as the load on the HV regulator 122 increases and the PFM frequency increases, the controller 302 decrements the current code to decrease the current load generated by the digital VCB 136D to avoid generating more current than necessary to keep the PFM frequency out of the audible range, thereby conserving power.

Figures 4A, 4B:
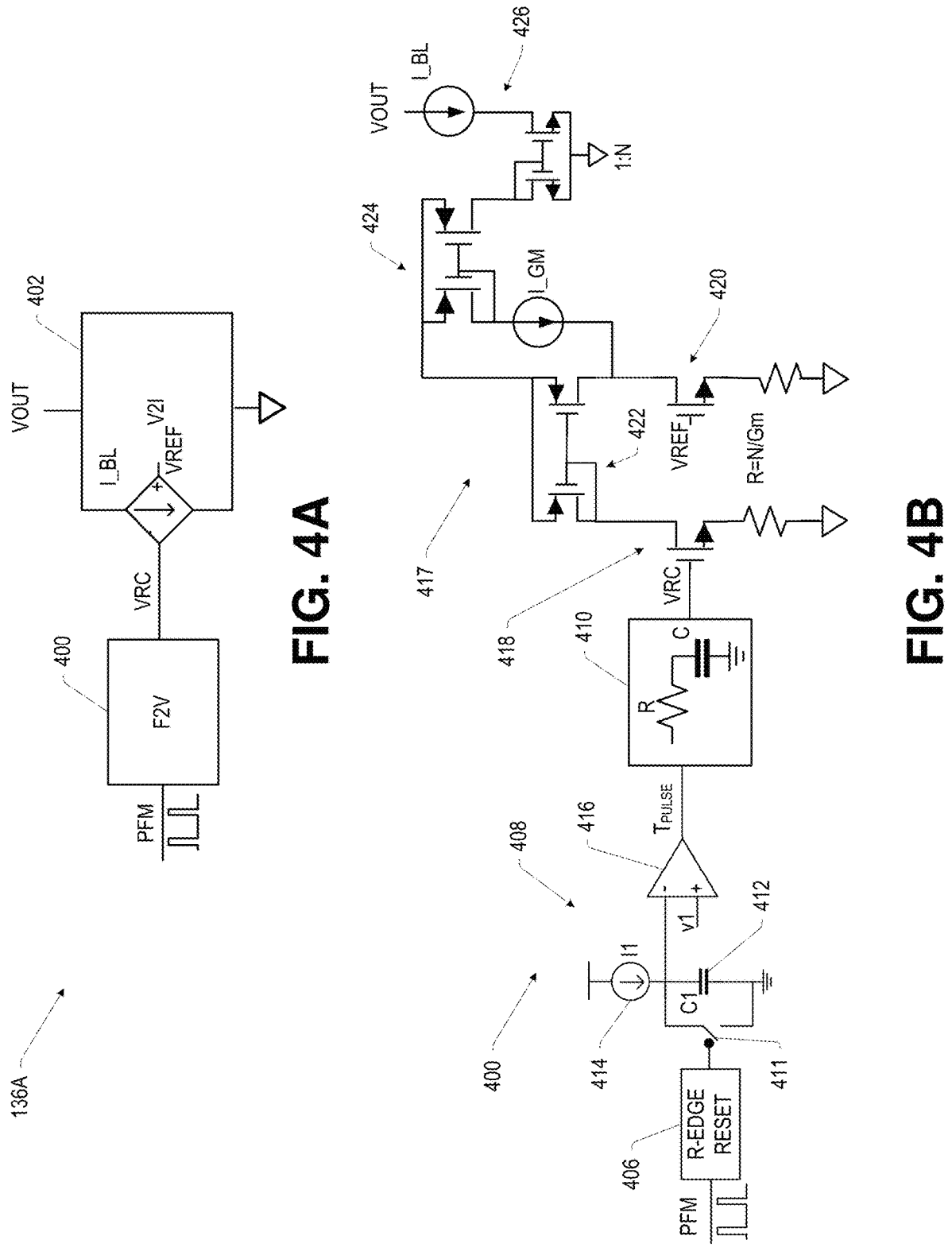
FIG. 4A is a block diagram of an analog variable current bleed unit, in accordance with some embodiments.
FIG. 4B is a circuit diagram of the analog variable current bleed unit, in accordance with some embodiments.

FIG. 4A is a block diagram of an analog VCB 136A and FIG. 4B is a circuit diagram of the analog VCB 136A, in accordance with some embodiments. In some embodiments, the analog VCB 136A comprises a frequency-to-voltage (F2V) converter 400 configured to generate a voltage corresponding to the frequency of the PFM signal and a voltage-to-current (V2I) converter 402 configured to generate a bleed current based on the output of the F2V converter 400. In some embodiments, the F2V converter 400 comprises a rising edge reset unit 406 that generates a reset signal for a pulse generator 408 based on a rising edge of the PFM signal. The pulse generator 408 generates a pulse of fixed width, $T_{PULSE}$, and time period of this signal indicates the time interval between PFM pulses. The output of the pulse generator 408 is provided to an RC filter 410 that generates a control voltage, $V_{RC}$, based on $T_{PULSE}$, where:

$$v_{RC} = V_{BUS\_IN} * \frac{T_{PULSE}}{T_{PFM}}.$$

In some embodiments, the pulse generator 408 comprises a reset switch 411 controlled by the rising edge reset unit 406, a capacitor 412 having a capacitance of C1 charged by a current source 414 outputting a current I1, and a comparator 416. After a discharge of the capacitor 412 by the switch 411 at a rising edge of the PFM signal, the capacitor 412 charges based on the current I1 from the current source 414 and the capacitance C1. A reference voltage, v1, for the comparator is based on $T_{PULSE}$, I1, and C1. In an example, $T_{PULSE}$=25 us, I1=50 nA, and C1=1 pF. The reference voltage for this example is:

$$v_1 = \frac{I1 * T_{PULSE}}{C_1} = 1.25 \text{ V}.$$

The voltage, $V_{RC}$, which corresponds to the time between PFM pulses, is provided to a transconductance amplifier 417 having an input leg 418 controlled by $V_{RC}$, an output leg 420 controlled by a reference voltage, $V_{REF}$, a current mirror 422 that generates a transconductance current, IGM, and an output stages 424 and 426 that generates the bleed current, i_BL, according to:

$$i_{GM} = \frac{G_m}{N}(V_{REF} - V_{RC})$$

$$i\_bl = G_m(V_{REF} - V_{RC}),$$

where $G_m$=20 mS and N=1000 in an example.

The reference voltage, $V_{REF}$, is selected such that when i_L=0 mA, i_bl draws current to keep $T_{PFM}$ at 50 us or less. As i_L increases, i_BL decreases. An increase in $V_{RC}$ corresponds to a decrease in $T_{PFM}$.

Figures 5, 6:
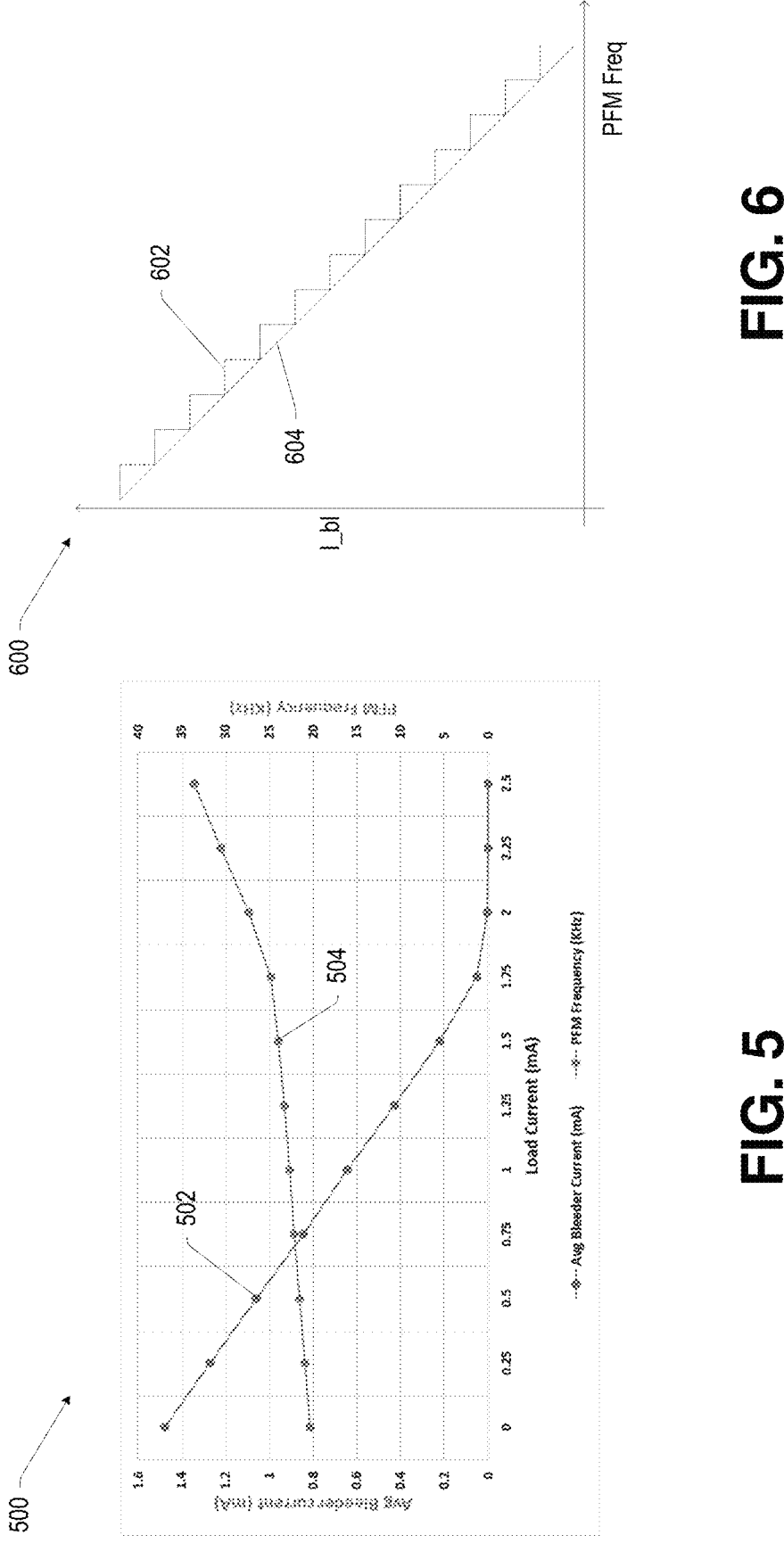
FIG. 5 is a diagram illustrating the operation of the analog variable current bleed unit as a function of load current, i_L, in accordance with some embodiments.
FIG. 6 is a diagram illustrating the operation of the digital variable current bleed unit and the analog variable current bleed unit as a function of PFM frequency, i_L, in accordance with some embodiments.

FIG. 5 is a diagram 500 illustrating the operation of the analog VCB 136A as a function of load current, i_L, in accordance with some embodiments. A bleed current curve 502 shows that the bleed current, i_BL, increases as the load current, i_L, decreases. A PFM frequency curve 504 illustrates that the PFM frequency remains above the audible range, e.g., 20 KHz, based on the bleed current compensation generated by the analog VCB 136A.

FIG. 6 is a diagram 600 illustrating the operation of the digital VCB 136D and the analog VCB 136A as a function of PFM frequency, $T_{PFM}$, in accordance with some embodiments. A curve 602 illustrates the bleed current, i_BL, generated by the digital VCB 136D as a function of the PFM frequency. The curve 602 exhibits steps according to the incrementing digital current code provided to the current DAC 304. A curve 604 illustrates the bleed current, i_BL, generated by the analog VCB 136A as a function of the PFM frequency. The curve 602 exhibits a generally linear function of bleed current verses PFM frequency.

Figure 7:
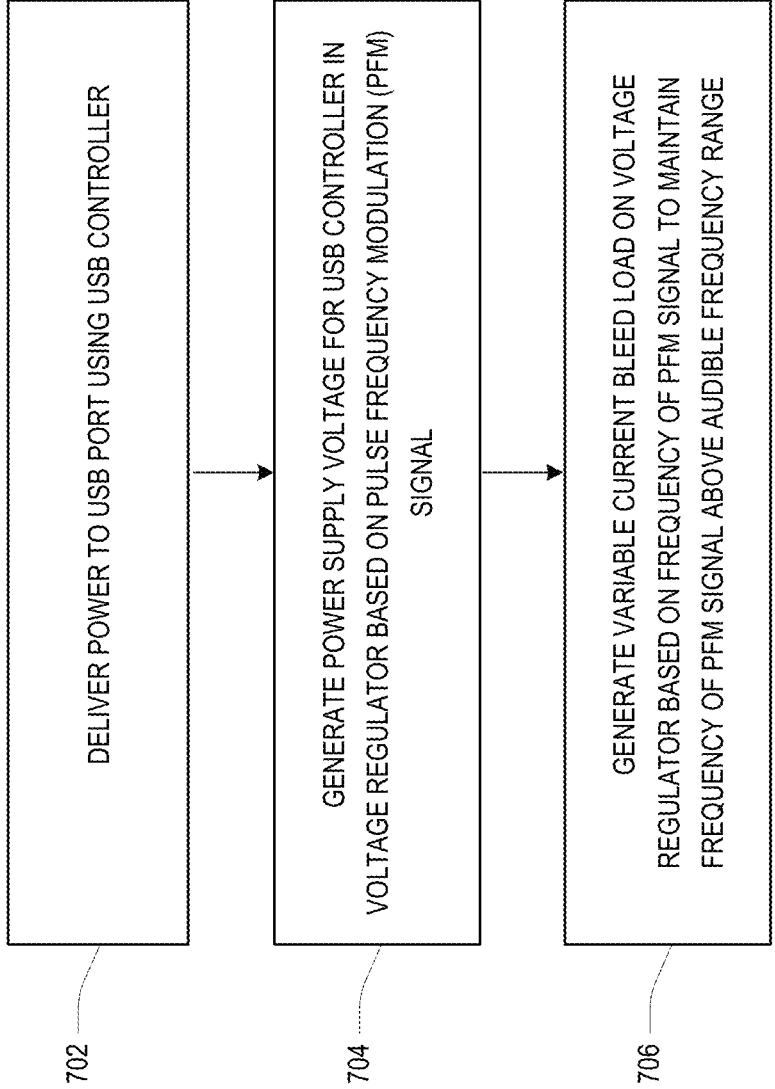
FIG. 7 is a flowchart illustrating a method of operating a USB power adaptor to avoid audible noise generation, in accordance with some embodiments.

FIG. 7 is a flowchart illustrating a method 700 of operating a USB power adaptor to avoid audible noise generation, in accordance with some embodiments. At 702, power is delivered to a USB port 104 using a USB controller 102. At 704, a power supply voltage for the USB controller 102 is generated in a voltage regulator 122 based on a pulse frequency modulation (PFM) signal. At 706, a variable current bleed load on the voltage regulator 122 is generated based on a frequency of the PFM signal to maintain the frequency of the PFM signal above an audible frequency range.

Figure 8:
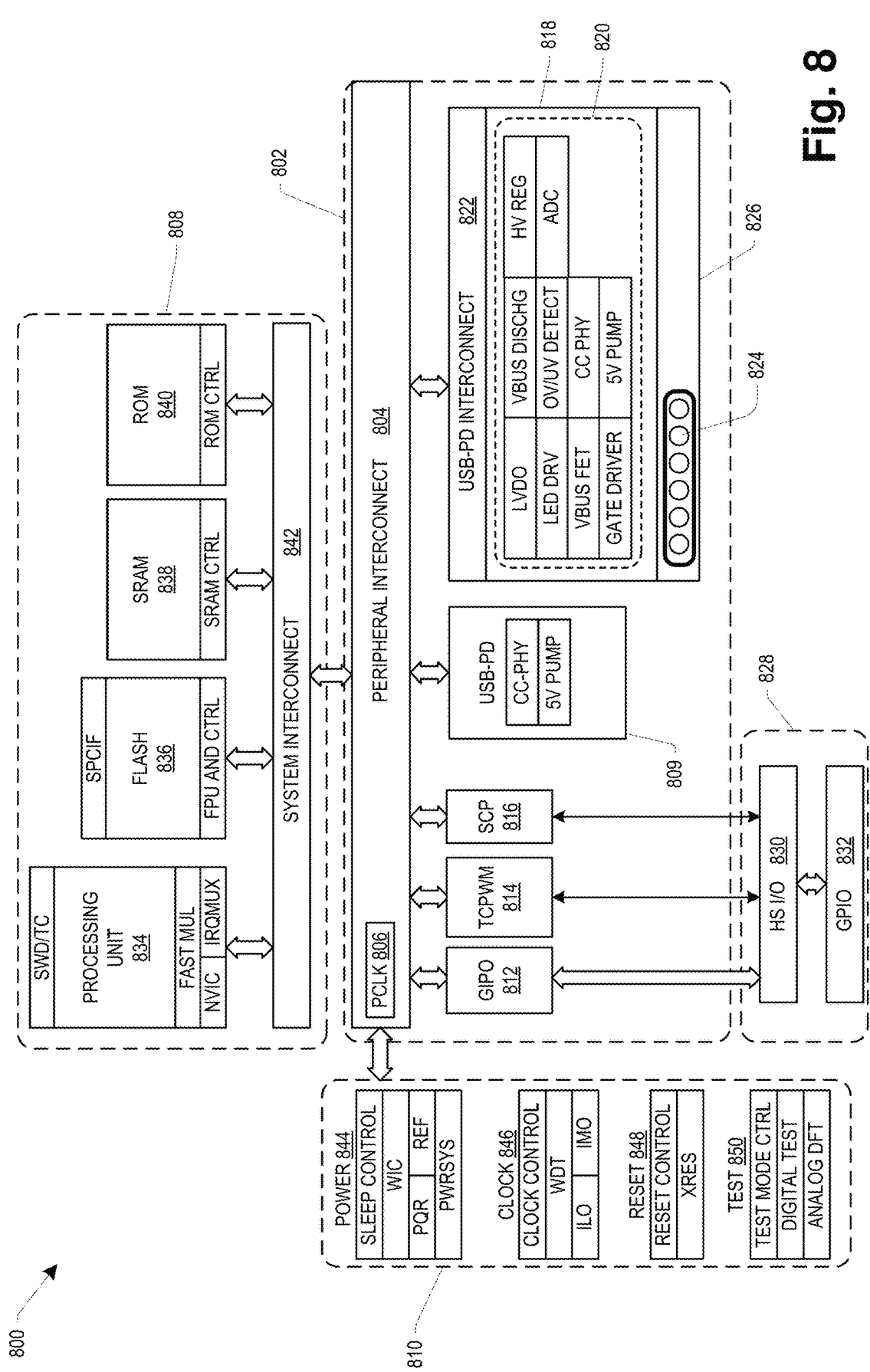
FIG. 8 is diagram of an on-chip, integrated circuit (IC) USB controller, in accordance with some embodiments.

FIG. 8 is a block diagram illustrating a system 800 for a USB device, in accordance with some embodiments. In some embodiments, the system 800 comprises a peripheral subsystem 802, a peripheral interconnect 804, a CPU subsystem 808, a USB-PD controller 809. In some embodiments, the peripheral subsystem 802 includes a number of components for use in USB power delivery (USB-PD). The peripheral subsystem 802 may include the peripheral interconnect 804 including a peripheral clock module (PCLK) 806 for providing clock signals to the various components of the peripheral subsystem 802. The peripheral interconnect 804 may be a peripheral bus, such as a single level or Multi-level Advanced High Performance Bus (AHB), and can provide a data and control interface between the peripheral subsystem 802 and the CPU subsystem 808. The peripheral interconnect 804 may include controller circuitry, such as direct memory access (DMA) controllers, which may be programmed to transfer data between peripheral blocks without input from the CPU subsystem 808, without control of the CPU subsystem 808, or without stressing the same transfer.

The peripheral interconnect 804 may be used to couple the peripheral subsystem 802 components to other components of the system 800. A number of general purpose inputs/outputs (GPIOs) 812 may be coupled to the peripheral interconnect 804 for sending and receiving signals. The GPIOs 812 may include circuitry configured to implement various functions such as pull-up, pull-down, input threshold selection, input and output buffer enable/disable, single multiplexing, and so on. Other functions can also be implemented by the GPIOs 812. One or more timer/counter/pulse width modulators (TCPWM) 814 may also be coupled to the peripheral interconnect and may include circuitry to implement timing circuits (timers), counters, pulse width modulators (PWMs), decoders, and other digital functions associated with I/O signals work and can provide digital signals for system components of the system 800. The peripheral subsystem 802 may also include one or more Serial Communication Blocks (SCBs) 816 for implementing serial communication interfaces such as I2C, Serial Peripheral Interface (SPI), Universal Asynchronous Receiver/Transmitter (UART), Controller Area Network (CAN), CXPI (Clock Extension Peripheral Interface), etc.

For USB power delivery applications, the peripheral subsystem 802 may include a USB power delivery subsystem 818 coupled to the peripheral interconnect 804 and including a set of USB PD modules 820 for use with USB power delivery. The USB PD modules 820 may be coupled to the peripheral interconnect 804 by a USB-PD interconnect 822. The USB PD modules 820 may include: a LVDO, an LED driver, a VBUS FET unit, a gate driver, a VBUS discharge unit, an OV/UV unit, communication channel PHY (CC PHY) logic for supporting communications on a Type-C Communication Channel (CC), a 5V pump unit, a high voltage regulator (HV REG) for converting the power supply voltage to the precise voltage (e.g., 3.6V) needed by the USB controller 102, and one or more ADC units.

The USB power delivery subsystem 818 may also include pads 824 for external connections and Electrostatic Discharge (ESD) suppression circuitry 826 that may be required on a Type-C port. The USB PD modules 820 may also include a communication module for retrieving and transmitting information, such as control signals, such as from the USB controller 102.

The GPIOs 812, the TCPWM 814, and the SCB 816 may be coupled to an input/output (I/O) subsystem 828, which may include a high-speed (HS) I/O matrix 830 connected to a number of GPIOs 832. The GPIOs 812, the TCPWM 814, and the SCB 816 may be coupled to the GPIOs 832 through the HS-I/O matrix 830.

The central processing unit (CPU) subsystem 808 is provided for processing instructions, storing program information and data. The CPU subsystem 808 may include one or more processing units 834 for executing instructions and reading from and writing to memory locations from a number of memories. The processing unit 834 may be a processor suitable for operation in an integrated circuit (IC) or system-on-chip (SOC) device. In some embodiments, the processing unit 834 may be optimized for low power operation with extensive clock gating. In this embodiment, different internal control circuits can be implemented for processing unit operation in different power states. For example, the processing unit 834 may include a single wire debug (SWD) module, a terminal count (TC) module, a fast multiplier, a nested vector interrupt controller (NVIC), and an interrupt multiplexer (IRQMUX). The CPU subsystem 808 may include one or more memories, including a flash memory 836, a static random access memory (SRAM) 838, and a read only memory (ROM) 840. The flash memory 836 may be non-volatile memory (NAND flash, NOR flash, etc.) configured to store data, programs, and/or other firmware instructions. The flash memory 836 may include system performance controller interface (SPCIF) registers and a read accelerator and, by being integrated into the CPU subsystem 808, improve access times. The SRAM 838 may be volatile memory configured to store data and firmware instructions accessible by the processing unit 834. The ROM 840 may be configured to store boot routines, configuration parameters, and other firmware parameters and settings that do not change during operation of the system 800. The SRAM 838 and the ROM 840 may have associated control circuitry. The processing unit 834 and the memory modules 836, 838, 840 may be coupled to a system interconnect 842 to route signals to and from the various components of the CPU subsystem 808 to other blocks or modules of the system 800. The system interconnect 842 can be implemented as a system bus, such as a single-level or multi-level AHB. The system interconnect 842 may be configured as an interface to couple the various components of the CPU subsystem 808 together. The system interconnect 842 may be coupled to the peripheral interconnect 804 to provide signal paths between the CPU subsystem 808 and components of the peripheral subsystem 802.

The system resources 810 may include a power module 844, a clock module 846, a reset module 848, and a test module 850. The power module 844 may include a sleep control module, a wake-up interrupt control (WIC) module, a power-on-reset (POR) module, a number of voltage references (REF), and a PWRSYS module. In some embodiments, the power module 844 may include circuitry that allows the system 800 to draw power from and/or provide power to external sources at different voltage and/or current levels and control operation in different power states, such as active, low power, or sleep. The clock module 846 may include a clock control module, a watchdog timer (WDT), an internal low-speed oscillator (ILO), and an internal main oscillator (IMO). The reset module 848 may include a reset control module and an external reset module (XRES module). The test module 850 may include a module to control and enter a test mode, as well as test control modules for analog and digital functions (digital test and analog DFT).

The system 800 may be implemented in a monolithic (e.g., single) semiconductor die. In other embodiments, different parts or modules of the system 800 may be implemented on different semiconductor dies. For example, the memory modules 836, 838, 840 of the CPU subsystem 808 may be on-chip or off-chip. In still other embodiments, circuitry with separate dies can be packaged in a single "chip" or remain separate and arranged on a circuit board (or in a USB cable connector) as separate elements.

The system 800 can be implemented in a number of application contexts to provide USB PD functionality. In any application context, an electronic device (e.g., a USB-enabled device) may have an IC controller or SOC implementation embodied by the system 800 arranged and configured to perform operations according to the techniques described herein. In an embodiment, the system 800 may be arranged and configured in a personal computer (PC) power adapter for a laptop, notebook computer, and so on. In another embodiment, the system 800 may be housed in a power adapter (e.g., a wall charger) for a mobile electronic device (e.g. a smartphone, a tablet, etc.). In another embodiment, the system 800 may be placed and configured in a wall outlet configured to provide power via USB Type-A and/or Type-C port(s). In another embodiment, the system 800 may be arranged and configured in a car charger configured to provide power via USB Type-A and/or Type-C port(s). In yet another embodiment, the system 800 may be arranged and configured in a power bank that can be charged via a USB Type-A and/or Type-C port and then provide power to another electronic device. In other embodiments, a system such as the system 800, may be configured with the power switch gate control circuitry described herein and may be incorporated into various other USB-enabled electronic or electromechanical devices.

It should be understood that a system, such as the system 800, implemented on or as an IC controller, can be placed in various applications that vary in terms of the type of power source used and the direction in which power is supplied. For example, in the case of a car charger, the power source is a car battery that provides DC power, while in the case of a mobile power adapter, the power source is an AC wall outlet. Further, in the case of a PC power adapter, the flow of power input is from a provider device to a consumer device, while in the case of a power bank, the flow of power input can be in either direction, depending on whether the power bank is operating as a power provider (e.g., to power another device) or as a power consumer (e.g., to allow itself to be charged). For these reasons, the various applications of the system 800 should be considered in an illustrative rather than a limiting sense.

In an embodiment of the techniques presented herein, a universal serial bus power delivery (USB-PD) power adaptor comprises a USB port, and a USB controller configured to deliver power to the USB port, wherein the USB controller comprises a voltage regulator configured to generate a power supply voltage based on a pulse frequency modulation (PFM) signal, and a variable current bleed unit configured to generate a variable current bleed load on the voltage regulator based on a frequency of the PFM signal to maintain the frequency of the PFM signal above an audible frequency range.

In an embodiment of the techniques presented herein, the variable current bleed unit comprises a digital variable current bleed unit.

In an embodiment of the techniques presented herein, the digital variable current bleed unit comprises a frequency calculator configured to determine the frequency of the PFM signal, a current digital to analog converter configured to generate the variable current bleed load based on a current code, and a controller configured to generate the current code based on the frequency of the PFM signal.

In an embodiment of the techniques presented herein, the variable current bleed unit comprises an analog variable current bleed unit.

In an embodiment of the techniques presented herein, the analog variable current bleed unit comprises a frequency-to-voltage converter configured to generate a control voltage as a function of the frequency of the PFM signal, and a voltage-to-current converter configured to generate the variable current bleed load based on the control voltage.

In an embodiment of the techniques presented herein, the frequency-to-voltage converter comprises a pulse generator configured to generate a pulse based on a time interval between PFM pulses in the PFM signal, a rising edge reset unit configured to generate a reset signal for the pulse generator to terminate the pulse based on a rising edge of the PFM signal, and a filter configured to generate the control voltage based on the pulse.

In an embodiment of the techniques presented herein, the pulse generator comprises a current source, a capacitor connected to the current source, a switch controlled by the reset signal to discharge the capacitor, and a comparator configured to generate the pulse based on a reference voltage and a voltage on the capacitor.

In an embodiment of the techniques presented herein, the voltage-to-current converter comprises a transconductance amplifier.

In an embodiment of the techniques presented herein, a method for operating a universal serial bus power delivery (USB-PD) power adaptor comprises delivering power to a USB port using a USB controller, generating a power supply voltage for the USB controller in a voltage regulator based on a pulse frequency modulation (PFM) signal, and generating a variable current bleed load on the voltage regulator based on a frequency of the PFM signal to maintain the frequency of the PFM signal above an audible frequency range.

In an embodiment of the techniques presented herein, generating the variable current bleed load comprises configuring a digital variable current bleed unit based on the frequency of the PFM signal.

In an embodiment of the techniques presented herein, configuring the digital variable current bleed unit comprises determining the frequency of the PFM signal in a frequency calculator, generating the variable current bleed load in a current digital to analog converter based on a current code, and generating the current code based on the frequency of the PFM signal.

In an embodiment of the techniques presented herein, generating the variable current bleed load comprises configuring an analog variable current bleed unit based on the frequency of the PFM signal.

In an embodiment of the techniques presented herein, configuring the analog variable current bleed unit comprises generating a control voltage in a frequency-to-voltage converter as a function of the frequency of the PFM signal, and generating the variable current bleed load in a voltage-to-current converter based on the control voltage.

In an embodiment of the techniques presented herein, generating the control voltage in the frequency-to-voltage converter comprises generating a pulse in a pulse generator based on a time interval between PFM pulses in the PFM signal, generating a reset signal for the pulse generator based on a rising edge of the PFM signal to terminate the pulse, and generating the control voltage based on the pulse.

In an embodiment of the techniques presented herein, generating the pulse in the pulse generator comprises charging a capacitor with a current source, generating the pulse based on a reference voltage and a voltage on the capacitor, and controlling a switch based on the reset signal to discharge the capacitor to terminate the pulse.

In an embodiment of the techniques presented herein, generating the variable current bleed load in the voltage-to-current converter comprises generating the variable current bleed load in a transconductance amplifier.

In an embodiment of the techniques presented herein, a universal serial bus power delivery (USB-PD) power adaptor comprises a USB port, a power switch connected between a voltage input terminal and the USB port, and a USB controller configured to control the power switch to deliver power to the USB port from the voltage input terminal, wherein the USB controller comprises a voltage regulator configured to generate a power supply voltage based on a pulse frequency modulation (PFM) signal, and a variable current bleed unit configured to generate a variable current bleed load on the voltage regulator based on a frequency of the PFM signal to maintain the frequency of the PFM signal above an audible frequency range.

In an embodiment of the techniques presented herein, the variable current bleed unit comprises a digital variable current bleed unit, comprises a frequency calculator configured to determine the frequency of the PFM signal, a current digital to analog converter configured to generate the variable current bleed load based on a current code, and a controller configured to generate the current code based on the frequency of the PFM signal.

In an embodiment of the techniques presented herein, the variable current bleed unit comprises an analog variable current bleed unit, comprises a frequency-to-voltage converter configured to generate a control voltage as a function of the frequency of the PFM signal, and a voltage-to-current converter configured to generate the variable current bleed load based on the control voltage.

In an embodiment of the techniques presented herein, the frequency-to-voltage converter comprises a pulse generator configured to generate a pulse based on a time interval between PFM pulses in the PFM signal, a rising edge reset unit configured to generate a reset signal for the pulse generator to terminate the pulse based on a rising edge of the PFM signal, and a filter configured to generate the control voltage based on the pulse, and the voltage-to-current converter comprises a transconductance amplifier.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Further, unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "exemplary" and/or the like is used herein to mean serving as an example, instance, illustration, etc., and not necessarily as advantageous. As used herein, "or" is intended to mean an inclusive "or" rather than an exclusive "or". In addition, "a" and "an" as used in this application can generally be construed to mean "one or more" unless specified otherwise or clear from context to be directed to a singular form. Also, at least one of A and B and/or the like generally means A or B and/or both A and B. Furthermore, to the extent that "includes", "having", "has", "with", and/or variants thereof are used in either the detailed description or the claims, such terms are intended to be inclusive in a manner similar to the term "comprising".

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A universal serial bus power delivery (USB-PD) power adaptor comprising:
   a USB port; and
   a USB controller configured to deliver power to the USB port, wherein the USB controller comprises:
      a voltage regulator configured to generate a power supply voltage dependent on a load current of the USB controller based on a pulse frequency modulation (PFM) signal having a switching frequency; and
   a variable current bleed unit comprising a control unit configured to generate a variable current bleed load on the voltage regulator based on the switching frequency and an audible frequency threshold to add a bleed current not dependent on the load current of the USB controller to the load current to maintain a frequency of the PFM signal above an audible frequency range.

2. The USB-PD power adaptor of claim 1, wherein:
   the variable current bleed unit comprises a digital variable current bleed unit.

3. The USB-PD power adaptor of claim 2, wherein the control unit in the digital variable current bleed unit comprises:
   a frequency calculator configured to determine the frequency of the PFM signal;
   a current digital to analog converter configured to generate the variable current bleed load based on a current code; and
   a controller configured to generate the current code based on the frequency of the PFM signal.

4. The USB-PD power adaptor of claim 1, wherein:
   the variable current bleed unit comprises an analog variable current bleed unit.

5. The USB-PD power adaptor of claim 4, wherein the control unit in the analog variable current bleed unit comprises:
   a frequency-to-voltage converter configured to generate a control voltage as a function of the frequency of the PFM signal; and
   a voltage-to-current converter configured to generate the variable current bleed load based on the control voltage.

6. The USB-PD power adaptor of claim 5, wherein the frequency-to-voltage converter comprises:
   a pulse generator configured to generate a pulse based on a time interval between PFM pulses in the PFM signal;
   a rising edge reset unit configured to generate a reset signal for the pulse generator to terminate the pulse based on a rising edge of the PFM signal; and
   a filter configured to generate the control voltage based on the pulse.

7. The USB-PD power adaptor of claim 6, wherein the pulse generator comprises:
   a current source;
   a capacitor connected to the current source;
   a switch controlled by the reset signal to discharge the capacitor; and
   a comparator configured to generate the pulse based on a reference voltage and a voltage on the capacitor.

8. The USB-PD power adaptor of claim 5, wherein the voltage-to-current converter comprises a transconductance amplifier.

9. A method for operating a universal serial bus power delivery (USB-PD) power adaptor comprising:
   delivering power to a USB port using a USB controller;
   generating a power supply voltage dependent on a load current of the USB controller in a voltage regulator based on a pulse frequency modulation (PFM) signal having a switching frequency; and
   generating a variable current bleed load on the voltage regulator based on the switching frequency and an audible frequency threshold to add a bleed current not dependent on the load current of the USB controller to the load current to maintain a frequency of the PFM signal above an audible frequency range.

10. The method of claim 9, wherein generating the variable current bleed load comprises:

configuring a digital variable current bleed unit based on the frequency of the PFM signal.

11. The method of claim 10, wherein configuring the digital variable current bleed unit comprises:

determining the frequency of the PFM signal in a frequency calculator;

generating the variable current bleed load in a current digital to analog converter based on a current code; and generating the current code based on the frequency of the PFM signal.

12. The method of claim 9, wherein generating the variable current bleed load comprises:

configuring an analog variable current bleed unit based on the frequency of the PFM signal.

13. The method of claim 12, wherein configuring the analog variable current bleed unit comprises:

generating a control voltage in a frequency-to-voltage converter as a function of the frequency of the PFM signal; and generating the variable current bleed load in a voltage-to-current converter based on the control voltage.

14. The method of claim 13, wherein generating the control voltage in the frequency-to-voltage converter comprises:

generating a pulse in a pulse generator based on a time interval between PFM pulses in the PFM signal;

generating a reset signal for the pulse generator based on a rising edge of the PFM signal to terminate the pulse; and generating the control voltage based on the pulse.

15. The method of claim 14, wherein generating the pulse in the pulse generator comprises:

charging a capacitor with a current source;

generating the pulse based on a reference voltage and a voltage on the capacitor; and controlling a switch based on the reset signal to discharge the capacitor to terminate the pulse.

16. The method of claim 13, wherein generating the variable current bleed load in the voltage-to-current converter comprises:

generating the variable current bleed load in a transconductance amplifier.

17. A universal serial bus power delivery (USB-PD) power adaptor comprising:

a USB port;

a power switch connected between a voltage input terminal and the USB port; and a USB controller configured to control the power switch to deliver power to the USB port from the voltage input terminal, wherein the USB controller comprises:

a voltage regulator configured to generate a power supply voltage dependent on a load current of the USB controller based on a pulse frequency modulation (PFM) signal having a switching frequency; and a variable current bleed unit comprising a control unit configured to generate a variable current bleed load on the voltage regulator based on the switching frequency and an audible frequency threshold to add a bleed current not dependent on the load current of the USB controller to the load current to maintain the frequency of a PFM signal above an audible frequency range.

18. The USB-PD power adaptor of claim 17, wherein the variable current bleed unit comprises a digital variable current bleed unit, and the control unit comprises:

a frequency calculator configured to determine the frequency of the PFM signal;

a current digital to analog converter configured to generate the variable current bleed load based on a current code; and a controller configured to generate the current code based on the frequency of the PFM signal.

19. The USB-PD power adaptor of claim 17, wherein the variable current bleed unit comprises an analog variable current bleed unit, and the control unit comprises:

a frequency-to-voltage converter configured to generate a control voltage as a function of the frequency of the PFM signal; and a voltage-to-current converter configured to generate the variable current bleed load based on the control voltage.

20. The USB-PD power adaptor of claim 19, wherein:

the frequency-to-voltage converter comprises:

a pulse generator configured to generate a pulse based on a time interval between PFM pulses in the PFM signal;

a rising edge reset unit configured to generate a reset signal for the pulse generator to terminate the pulse based on a rising edge of the PFM signal; and a filter configured to generate the control voltage based on the pulse; and the voltage-to-current converter comprises a transconductance amplifier.

* * * * *